UNITED STATES PATENT OFFICE.

EMIL BRONNERT, OF NIEDERMORSCHWEILER, GERMANY, ASSIGNOR TO VEREINIGTE GLANZSTOFF-FABRIKEN A. G., OF ELBERFELD, GERMANY.

PROCESS OF PRODUCING FORMYLCELLULOSES.

1,046,729.     Specification of Letters Patent.     Patented Dec. 10, 1912.

No Drawing.     Application filed August 4, 1910. Serial No. 575,518.

*To all whom it may concern:*

Be it known that I, EMIL BRONNERT, a subject of the German Emperor, residing in Niedermorschweiler, Alsace, Germany, have invented certain new and useful Improvements in Processes of Producing Formylcelluloses, of which the following is a specification.

This invention relates to processes of producing formylcelluloses.

Processes heretofore employed for the production of acetyl cellulose have been quite elaborate, attended by considerable losses and expense, owing to the number of treatments to which the cellulose is subjected and the cost of materials employed, and have not been highly successful.

I have discovered, however, that the waste cellulose-hydrates, such as denitrated nitro cellulose threads "lusterous" threads and viscose threads from artificial silk making processes may not only be utilized in the production of formylcellulose, but may be utilized with peculiar advantage and with the production of a superior product. Such hydrates are of peculiar advantage because of the fact that the triformyl form of the formylcellulose may be obtained from them, which is a superior form as regards the flexibility and clearness of the product.

The present invention relates to a process of producing formylcellulose from such waste-cellulose-hydrates.

In practising this process, waste cellulose-hydrates, which are readily obtainable in large quantities and at small prices, are simply placed in formic acid and very gently heated. A formyl-cellulose solution is directly obtained.

The following formula represents as nearly as can be given the reactions which occur:—

The formic acid employed is preferably the ordinary technical formic acid of 96% concentration.

The cellulose-hydrates will dissolve in the formic acid at ordinary temperatures, but that which is preferred is up to 40° or 50° centigrade. At higher temperatures the solution is formed more rapidly, but is more thinly flowing, presumably in consequence of further hydrolysis of the cellulose-hydrates and formation of more-hydrated formylcelluloses.

The proper temperature at which to use the acid is, however, best determined in the manner set forth by Cross & Bevan in their book "*Outlines of Cellulose*," for testing other cellulose derivatives, that is, by taking portions of the solutions produced at different temperatures, evaporating the solvent, and testing the resultant product as to luster and elasticity.

It is not believed to be best to dissolve the cellulose-hydrates too rapidly or to have the solutions of too high a percentage, the best results, according to present knowledge, being obtained with a solution containing only 6% cellulose, produced at a moderate temperature, for example 25° centigrade. The formylcellulose is then obtained from the solution by removal of the surplus formic acid, this being preferably accomplished by distilling the acid at a low temperature in a rarefied atmosphere, until the desired consistency is reached. By this method the formic acid serving only as solvent may be recovered. Numerous substances, soluble in formic acid, for coloring, imparting flexibility, plasticity and the like to articles made from the product may be incorporated during the carrying out of the process. This product may be utilized for the formation of films, threads, plastic masses and the like, by "squirting" and other like operations.

It will thus be seen that by the present process formylcellulose may be obtained in a simple manner, and without the employment of the expensive chemicals required in present processes in the preliminary and subsequent treatment of the cellulose, and that materials which have heretofore been a waste in the artificial silk industry are utilized.

What is claimed is:—

1. The process of producing formylcelluloses, which consists in dissolving waste cellulose-hydrates from the artificial silk industry in formic acid.

2. The process of producing formylcelluloses, which consists in dissolving waste cellulose-hydrates from the artificial silk industry in formic acid at a temperature up to 50° centigrade.

3. The process of producing formylcelluloses, which consists in dissolving waste cellulose-hydrates from the artificial silk industry in formic acid, of approximately 96% concentration at a temperature up to 50° centigrade.

4. The process of producing formylcelluloses, which consists in dissolving waste cellulose-hydrates from the artificial silk industry in concentrated formic-acid at a moderate temperature and removing the surplus formic-acid.

5. The process of producing formylcelluloses, which consists in dissolving waste cellulose-hydrates from the artificial silk industry in concentrated formic-acid at a moderate temperature, to form a weak solution, and removing the surplus formic-acid.

6. The process of producing formylcelluloses, which consists in dissolving waste cellulose-hydrates from the artificial silk industry in formic-acid of approximately 96% concentration, at a temperature up to 50° cent., allowing the cellulose-hydrates to remain in the acid until a solution containing approximately 6% cellulose is formed and removing the surplus formic-acid.

7. The process of producing formylcelluloses, which consists in dissolving formed waste cellulose-hydrates from the artificial silk industry in formic acid.

8. The process of producing formylcelluloses, which consists in dissolving in formic acid waste cellulose-hydrates which have been precipitated in the form of threads from a spinning solution in the artificial silk industry.

In witness whereof, I have hereunto signed my name in the presence of two subscribing witnesses.

EMIL BRONNERT.

Witnesses:
AUGUST OOSTERMAN,
MARIA HEITTIZ.

---

Correction in Letters Patent No. 1,046,729.

It is hereby certified that Letters Patent No. 1,046,729, granted December 10, 1912, upon the application of Emil Bronnert, of Niedermorschweiler, Germany, for an improvement in "Processes of Producing Formylcelluloses," was erroneously issued to Vereinigte Glanzstoff-Fabriken A. G., as assignee of the entire interest, whereas said Letters Patent should have been issued to the inventor, *said Bronnert and Vereinigte Glanzstoff-Fabriken A. G.*, said corporation being owner of *one-half* interest only in said invention, as shown by the records of assignments in this office; and that the said Letters Patent should be read with this correction therein that the same may conform to the record of the case in the Patent Office.

Signed and sealed this 18th day of March, A. D., 1913.

[SEAL.]

C. C. BILLINGS,
*Acting Commissioner of Patents.* dustry in formic acid, of approximately 96% concentration at a temperature up to 50° centigrade.

4. The process of producing formylcelluloses, which consists in dissolving waste cellulose-hydrates from the artificial silk industry in concentrated formic-acid at a moderate temperature and removing the surplus formic-acid.

5. The process of producing formylcelluloses, which consists in dissolving waste cellulose-hydrates from the artificial silk industry in concentrated formic-acid at a moderate temperature, to form a weak solution, and removing the surplus formic-acid.

6. The process of producing formylcelluloses, which consists in dissolving waste cellulose-hydrates from the artificial silk industry in formic-acid of approximately 96% concentration, at a temperature up to 50° cent., allowing the cellulose-hydrates to remain in the acid until a solution containing approximately 6% cellulose is formed and removing the surplus formic-acid.

7. The process of producing formylcelluloses, which consists in dissolving formed waste cellulose-hydrates from the artificial silk industry in formic acid.

8. The process of producing formylcelluloses, which consists in dissolving in formic acid waste cellulose-hydrates which have been precipitated in the form of threads from a spinning solution in the artificial silk industry.

In witness whereof, I have hereunto signed my name in the presence of two subscribing witnesses.

EMIL BRONNERT.

Witnesses:
AUGUST OOSTERMAN,
MARIA HEITTIZ.

---

Correction in Letters Patent No. 1,046,729

It is hereby certified that Letters Patent No. 1,046,729, granted December 10, 1912, upon the application of Emil Bronnert, of Niedermorschweiler, Germany, for an improvement in "Processes of Producing Formylcelluloses," was erroneously issued to Vereinigte Glanzstoff-Fabriken A. G., as assignee of the entire interest, whereas said Letters Patent should have been issued to the inventor, *said Bronnert and Vereinigte Glanzstoff-Fabriken A. G.*, said corporation being owner of *one-half* interest only in said invention, as shown by the records of assignments in this office; and that the said Letters Patent should be read with this correction therein that the same may conform to the record of the case in the Patent Office.

Signed and sealed this 18th day of March, A. D., 1913.

[SEAL.]

C. C. BILLINGS,
*Acting Commissioner of Patents.*

It is hereby certified that Letters Patent No. 1,046,729, granted December 10, 1912, upon the application of Emil Bronnert, of Niedermorschweiler, Germany, for an improvement in "Processes of Producing Formylcelluloses," was erroneously issued to Vereinigte Glanzstoff-Fabriken A. G., as assignee of the entire interest, whereas said Letters Patent should have been issued to the inventor, *said Bronnert and Vereinigte Glanzstoff-Fabriken A. G.*, said corporation being owner of *one-half* interest only in said invention, as shown by the records of assignments in this office; and that the said Letters Patent should be read with this correction therein that the same may conform to the record of the case in the Patent Office.

Signed and sealed this 18th day of March, A. D., 1913.

[SEAL.]

C. C. BILLINGS,
*Acting Commissioner of Patents.*